United States Patent
Critchley et al.

(10) Patent No.: US 10,223,221 B2
(45) Date of Patent: Mar. 5, 2019

(54) ENCLOSURE-ENCAPSULATED RAID REBUILD

(71) Applicant: International Business Machines Corporation, Armonk, NY (US)

(72) Inventors: Daniel S. Critchley, Winchester (GB); Gordon D. Hutchinson, Eastleigh (GB); Gareth P. Jones, Chandler's Ford (GB); Jonathan W. Short, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/286,966

(22) Filed: Oct. 6, 2016

(65) Prior Publication Data
US 2018/0101456 A1 Apr. 12, 2018

(51) Int. Cl.
*G06F 11/00* (2006.01)
*G06F 11/20* (2006.01)
*G06F 11/10* (2006.01)

(52) U.S. Cl.
CPC ...... *G06F 11/2058* (2013.01); *G06F 11/1076* (2013.01); *G06F 11/2087* (2013.01); *G06F 2201/805* (2013.01); *G06F 2201/82* (2013.01)

(58) Field of Classification Search
CPC .......................... G06F 11/2058; G06F 11/2087
See application file for complete search history.

(56) References Cited

U.S. PATENT DOCUMENTS

| | | |
|---|---|---|
| 6,351,838 B1 | 2/2002 | Amelia |
| 8,099,623 B1 | 1/2012 | Li et al. |
| 8,930,663 B2 | 1/2015 | Yochai et al. |
| 9,250,807 B1 | 2/2016 | Au et al. |
| 9,959,062 B1 * | 5/2018 | Piszczek .............. G06F 3/0619 |

(Continued)

OTHER PUBLICATIONS

Mehling, Herman, "Can Declustering Save RAID Storage Technology," http://www.enterprisestorageforum.com/technology/features/article.php/3883346/CanDeclusteringSaveRAIDStorageTechnology.htm, May 20, 2010.

(Continued)

*Primary Examiner* — Bryce P Bonzo
*Assistant Examiner* — Katherine Lin
(74) *Attorney, Agent, or Firm* — Nelson and Nelson; Daniel P. Nelson; Alexis V. Nelson

(57) ABSTRACT

A method for recovering data in a redundant array of independent disks (RAID) is disclosed. In one embodiment, such a method includes implementing a RAID in a storage architecture comprising a RAID controller and a storage enclosure containing a set of storage drives belonging to the RAID. The RAID controller is configured to detect a failure condition associated with at least one of the storage drives in the set. In response to detecting the failure condition, the RAID controller sends, to the storage enclosure, an instruction to copy data from a first storage drive in the set to a second storage drive in the set as part of a RAID rebuild process. The storage enclosure receives the instruction and executes it without substantially involving the RAID controller in the copy process. A corresponding system and computer program product are also disclosed.

20 Claims, 8 Drawing Sheets

(56) References Cited

U.S. PATENT DOCUMENTS

| | | | |
|---|---|---|---|
| 2008/0046647 A1* | 2/2008 | Blinick | G06F 3/0626 |
| | | | 711/114 |
| 2009/0013213 A1 | 1/2009 | Kalman et al. | |
| 2014/0250269 A1 | 9/2014 | Shanbhag et al. | |
| 2016/0077764 A1 | 3/2016 | Ori | |

OTHER PUBLICATIONS

Wikipedia, "Apache Hadoop," https://en.wikipedia.org/wiki/Apache_Hadoop, Page last modified on Jun. 22, 2016.

Mellor, Chris, "XIV gets Infiniband and boosted CPUs," The Register, http://www.theregister.co.uk/2011/07/14/xiv_gen_3/, Jul. 14, 2011.

Pearson, Tony, "Double Drive Failure Debunked: XIV Two Years Later," Inside System Storage, https://www.ibm.com/developerworks/community/blogs/InsideSystemStorage/entry/ddf-debunked-xiv-two-years-later?lang=zh, Apr. 5, 2010.

Floyer, David, "The IBM XIV Storage Array Performance and Availability Envelope," http://wikibon.org/wiki/v/The_IBM_XIV_Storage_Array_Performance_and_Availability_Envelope, Last Updated Feb. 14, 2011.

Kelly, Jim, "We're all only here temporarily . . . XIV Drive Management," https://storagebuddhist.wordpress.com/2010/03/22/xiv-drive-management/, Mar. 22, 2010.

Wikipedia, "InfiniBand," https://en.wikipedia.org/wiki/InfiniBand, Last Updated Jul. 2, 2016.

Wikipedia, "Replication (computing)," https://en.wikipedia.org/wiki/Replication_(computing), Last Updated Mar. 28, 2016.

\* cited by examiner

ENCLOSURE-ENCAPSULATED RAID REBUILD

BACKGROUND

Field of the Invention

This invention relates to systems and methods for more efficiently recovering data when performing a RAID rebuild.

Background of the Invention

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

To improve the I/O performance of a RAID and/or accelerate the rebuild process when a storage drive fails, techniques such as "wide striping" and "distributed spares" may be used. With wide striping, data is distributed more widely across a larger set of storage drives. This improves average I/O performance since data may be read from or written to a larger set of storage drives in parallel, thereby aggregating the I/O performance of each of the storage drives. Wide striping may also reduce the time required to rebuild a RAID in the event of a failure, since the data needed to rebuild the failed drive may be read in parallel from a larger set of storage drives.

With distributed spares, a small amount of storage space is reserved on each storage drive belonging to a distributed RAID. Collectively, this storage space may be substantially equivalent to the entire storage space of one physical spare storage drive. When a storage drive in the RAID fails, data may be rebuilt on the distributed spare instead of a physical spare storage drive. The distributed spare allows data to be rebuilt much more quickly since data may be written to many storage drives in parallel as opposed to a single physical storage drive. Once data from the failed storage drive is reconstructed on the distributed spare, the data may be copied to a single physical spare storage drive to free up the storage space on the distributed spare, thereby making it available for future drive failures.

Despite the theoretical advantages of wide striping and distributed spares, hardware limitations may limit the actual performance gains provided by each of these technologies. For example, most RAID arrays use the serial attached SCSI (SAS) protocol to move data into and out of the storage drives. The amount of data that can be moved in and out of a RAID as part of a rebuild process is limited by the SAS chip and/or a bus (e.g. PCI bus) that is used to move data between the SAS chip and a CPU. This bottleneck currently limits the number of storage drives that may be included in a distributed RAID to about one hundred and twenty. Currently, if the number of storage drives is increased beyond about one hundred and twenty, performance and/or reliability of the distributed RAID may actually decrease.

In view of the foregoing, what are needed are systems and methods to reduce an amount of data moved through a SAS chip and/or bus (e.g., PCI bus) during a RAID rebuild process.

SUMMARY

The invention has been developed in response to the present state of the art and, in particular, in response to the problems and needs in the art that have not yet been fully solved by currently available systems and methods. Accordingly, the invention has been developed to more efficiently recover data in a redundant array of independent disks (RAID). The features and advantages of the invention will become more fully apparent from the following description and appended claims, or may be learned by practice of the invention as set forth hereinafter.

Consistent with the foregoing, a method for recovering data in a redundant array of independent disks (RAID) is disclosed herein. In one embodiment, such a method includes implementing a RAID in a storage architecture comprising a RAID controller and a storage enclosure containing a set of storage drives belonging to the RAID. The RAID controller is configured to detect a failure condition associated with at least one of the storage drives in the set. In response to detecting the failure condition, the RAID controller sends, to the storage enclosure, an instruction to copy data from a first storage drive in the set to a second storage drive in the set as part of a RAID rebuild process. The storage enclosure receives the instruction and executes it without substantially involving the RAID controller in the copy process.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
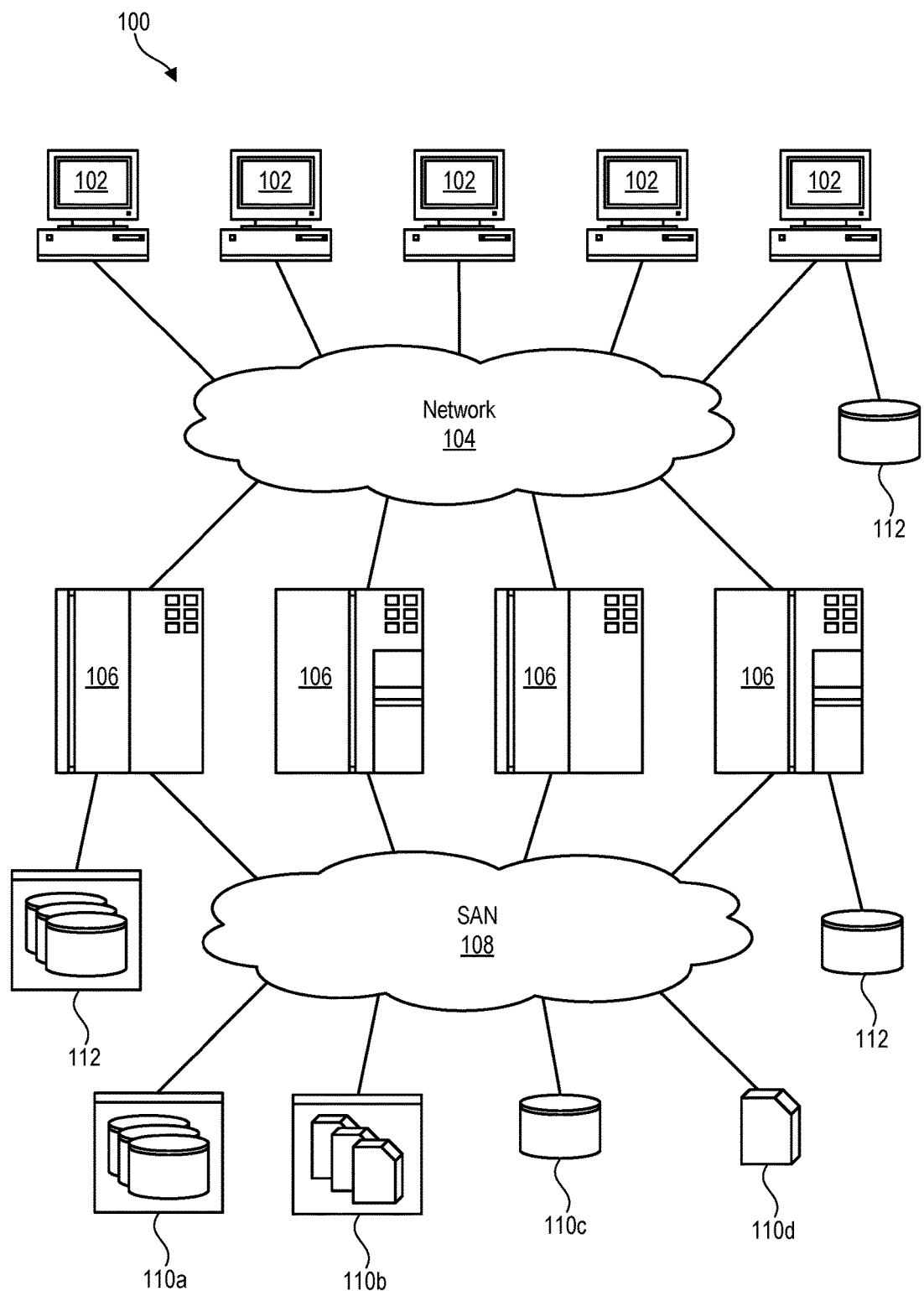
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
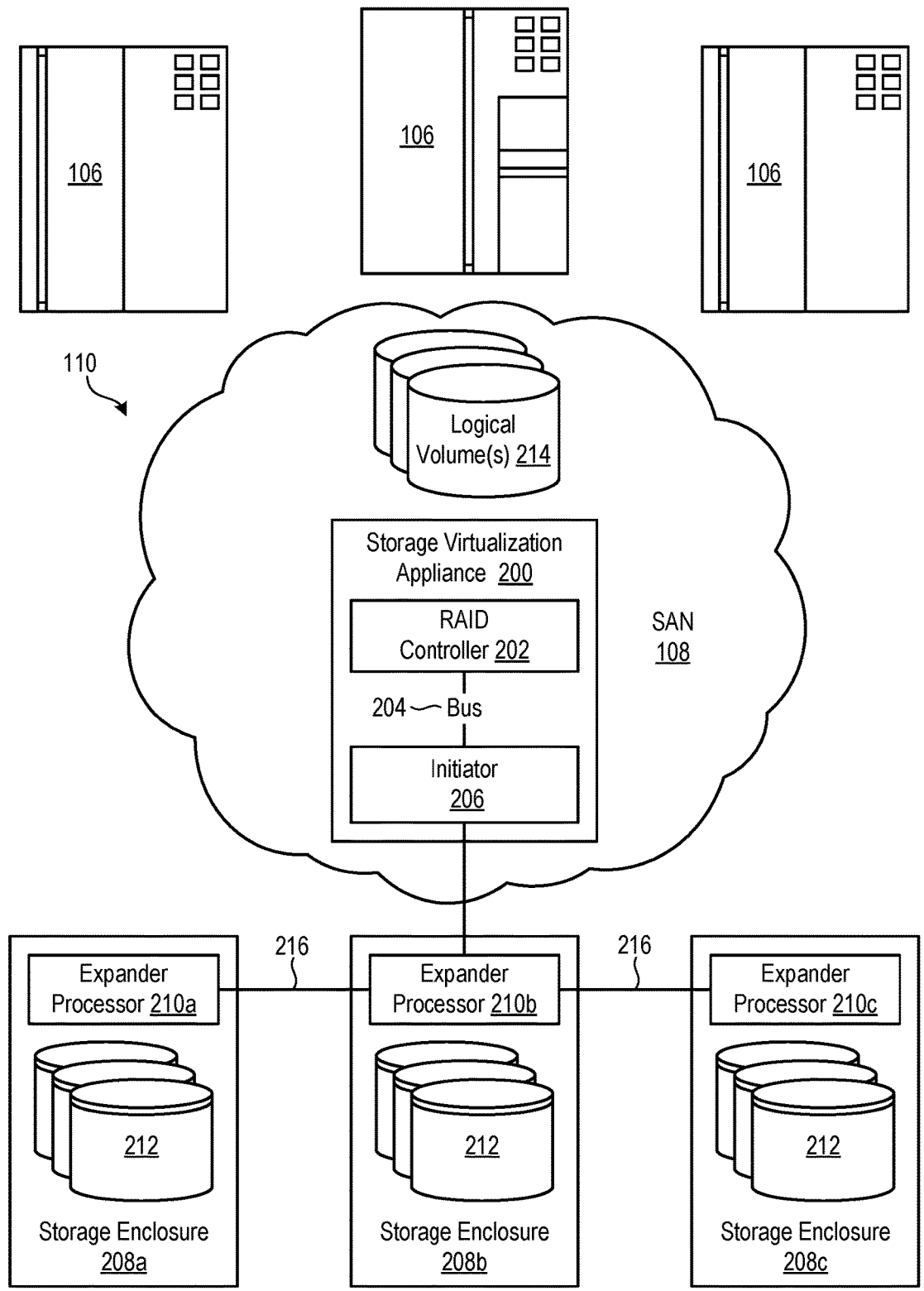
FIG. 2 is a high-level block diagram showing a particular type of storage system that may be used to implement a RAID.

Referring to FIG. 2, one example of a storage system 110 containing an array of hard-disk drives 204 and/or solid-state drives 204 is illustrated. In this example, the storage system 110 includes a storage virtualization appliance 200 and one or more storage enclosures 208a-c. Each of the storage enclosures 208 may contain one or more storage drives 212, such as hard disk drive and/or solid state drives. These storage drives 212 may be used to implement a redundant array of independent disks (RAID), such as a large distributed RAID. A RAID controller 202 (which may be code executing on a processor 202 or CPU 202), in the storage virtualization appliance 200, may be used to manage the storage drives 212 in the storage enclosures 208 so that they work as one or more logical units. These logical units may be presented as logical volumes 214 for read and write access by one or more host systems 106.

As shown in FIG. 2, in certain embodiments, the RAID controller 202 may communicate with an initiator 206 that originates device-service and task-management requests for processing by target devices, such as the illustrated storage drives 212. The initiator 206 may also receive responses for the same requests from the target devices. The initiator 206 may be provided as an on-board component on a motherboard of the storage virtualization appliance 200 or as an add-on host bus adapter. In certain embodiments, the initiator 206 is a SAS (Serial Attached SCSI) initiator 206.

The storage enclosures 208 may include expander processors 210 that form part of a service delivery subsystem and facilitate communication between the initiator 206 and storage drives 212. The expander processors 210 may enable communication with a very large number of storage drives 212 through a single initiator port. In certain embodiments, the expander processors 210 are SAS expanders as known to those of skill in the art. The expander processors 210 may enable the initiator 206 to communicate with more storage drives 212 than would otherwise be possible using the initiator 206 (which may be embodied as add-on host-bus adapter card, such as a PCI card) by itself. The expander processors 210 may in certain embodiments be chained together to increase the number of storage drives 212 that may communicate with the initiator 206, as shown in FIG. 2.

Notwithstanding the ability of the expander processors 210 to increase the number of storage drives 212 that may communicate with an initiator 206, hardware limitations within the storage virtualization appliance 200 may limit the actual performance gains provided by this capability. For example, as previously explained, most RAID arrays use the SAS protocol to move data into and out of the storage drives 212. The amount of data that can be moved in and out of these storage drives 212 as part of a RAID rebuild process may be limited by the SAS chip in the initiator 206 and a bus 204 (e.g. PCI bus 204) that is used to move data between the initiator 206 and the RAID controller 202. Every read that occurs to the storage drives 212 as part of a RAID rebuild process must normally be moved through the initiator 206 and bus 204 on its way to the RAID controller 202, and every write that occurs to the storage drives as are part of the RAID rebuild process must normally be moved from the RAID controller 202 through the bus 204 and initiator 206 on its way to the storage drives 212. These reads and writes compete with normal I/O requests (from host systems 106) that travel through the bus 204 and initiator 206 to the surviving storage drives 212, thereby impacting I/O performance of the system as a whole.

As a number of storage drives 212 in the RAID increases, the number of storage drives 212 that need to participate in a RAID rebuild process also increases. The bottleneck created by the initiator 206 and bus 204 currently limits the number of storage drives 212 that may be included in a distributed RAID to about one hundred and twenty. Currently, if the number of storage drives 212 is increased beyond about one hundred and twenty, performance and/or reliability of the distributed RAID may actually decrease.

In order to avoid or prevent this bottleneck, the expander processors 210 may, in certain embodiments, be reconfigured to move data between storage drives 212 in the RAID without involving, or at least minimally involving, the bus 204 and initiator 206. Instead of requiring all reads and writes to move through the initiator 206 and bus 204, data may move directly between the storage drives 212 and expander processors 210 in a way that bypasses the initiator 206 and bus 204. The RAID controller 202, instead of processing reads and writes, may simply send instructions to the expander processors 210 regarding how the data should be moved around. The cabling that connects the expander processors 210 together may provide a bus 216 or network 216 on which to transmit the data.

Embodiments of the invention may be particularly advantageous and applicable to RAID levels 1 and 10, and variations thereof, which may mirror data across storage drives 212 of the RAID, as opposed to using parity information to provide data redundancy. In RAIDs using RAID levels 1 or 10, data redundancy is provided by mirroring segments of data across pairs of drives. These pairs may be arranged in such a way that if one physical storage drive 212 fails, copies of all the segments on the failed storage drive 212 are spread around many if not all of the surviving storage drives 212. Thus, reconstructing data on a failed storage drive 212 may require reading data from all or substantially all of the other storage drives 212 in the RAID.

When a storage drive 212 fails in a RAID using RAID levels 1 or 10, the data on the failed storage drive 212 may be reconstructed by copying data from the surviving storage drives 212 either directly onto a new physical storage drive 212, or onto a distributed spare (which may involve writing to all or a large number of the surviving storage drives 212) and then onto a new physical storage drive 212. Because no parity value is needed to reconstruct the data of the failed storage drive 212, the RAID controller 202 may not need to recalculate lost data using parity values. Rather, the RAID controller 202 may supervise the copying of data by sending instructions to the expander processors 210. The expander processors 210 may receive the instructions and perform the actual copying of data between storage drives 212 without substantially involving the RAID controller 202, bus 204, and initiator 206. Thus, systems and methods in accordance with the invention may offload much if not all of the copy burden from the RAID controller 202 to the expander processors 210. This avoids pushing data through the bottleneck created by the initiator 206 and bus 204.

Figure 3:
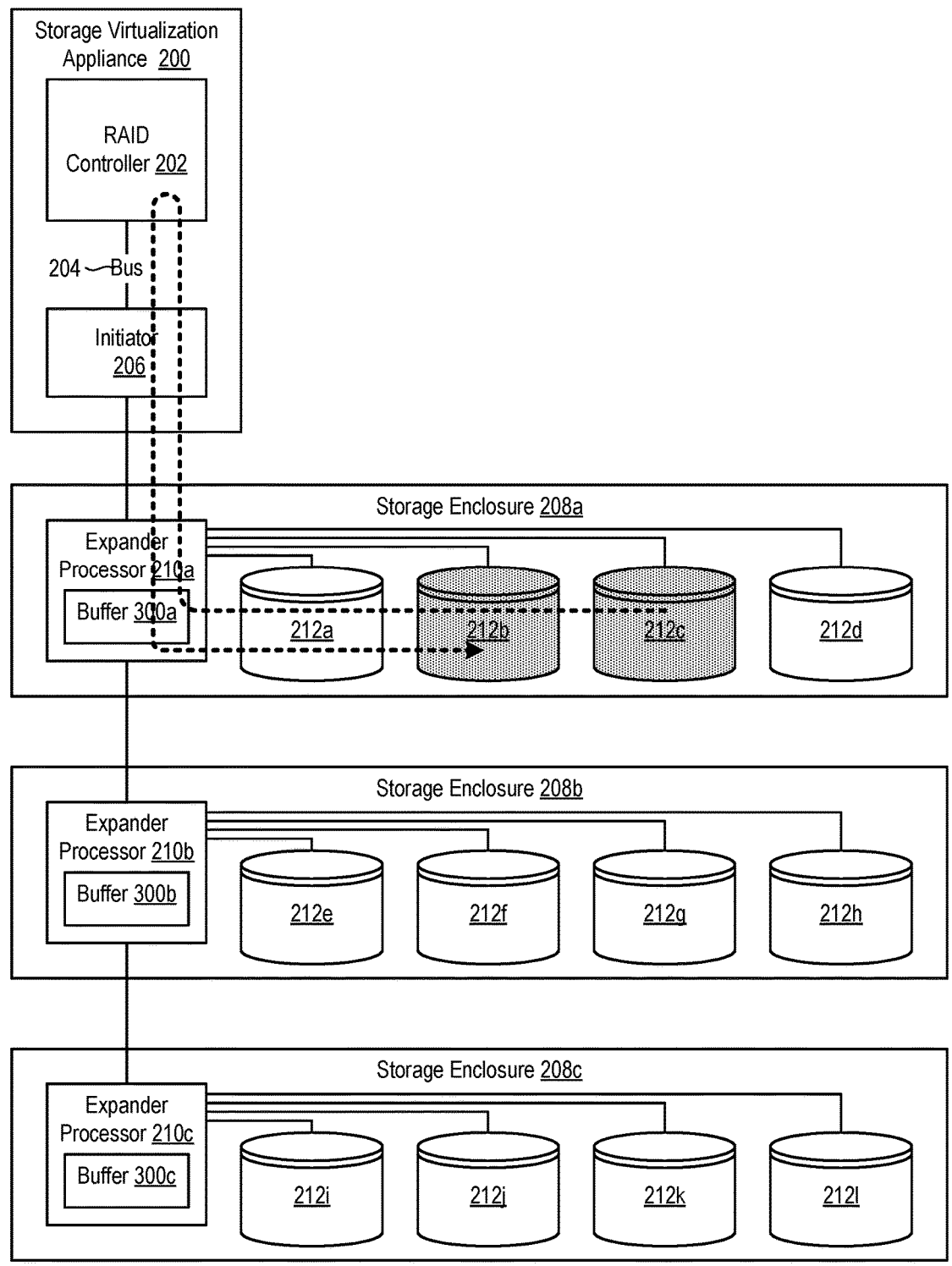
FIG. 3 is a high-level block diagram showing a conventional process for copying data from a first storage drive to a second storage drive as part of a RAID rebuild process, where the first and second storage drives are in the same storage enclosure.
Figure 4:
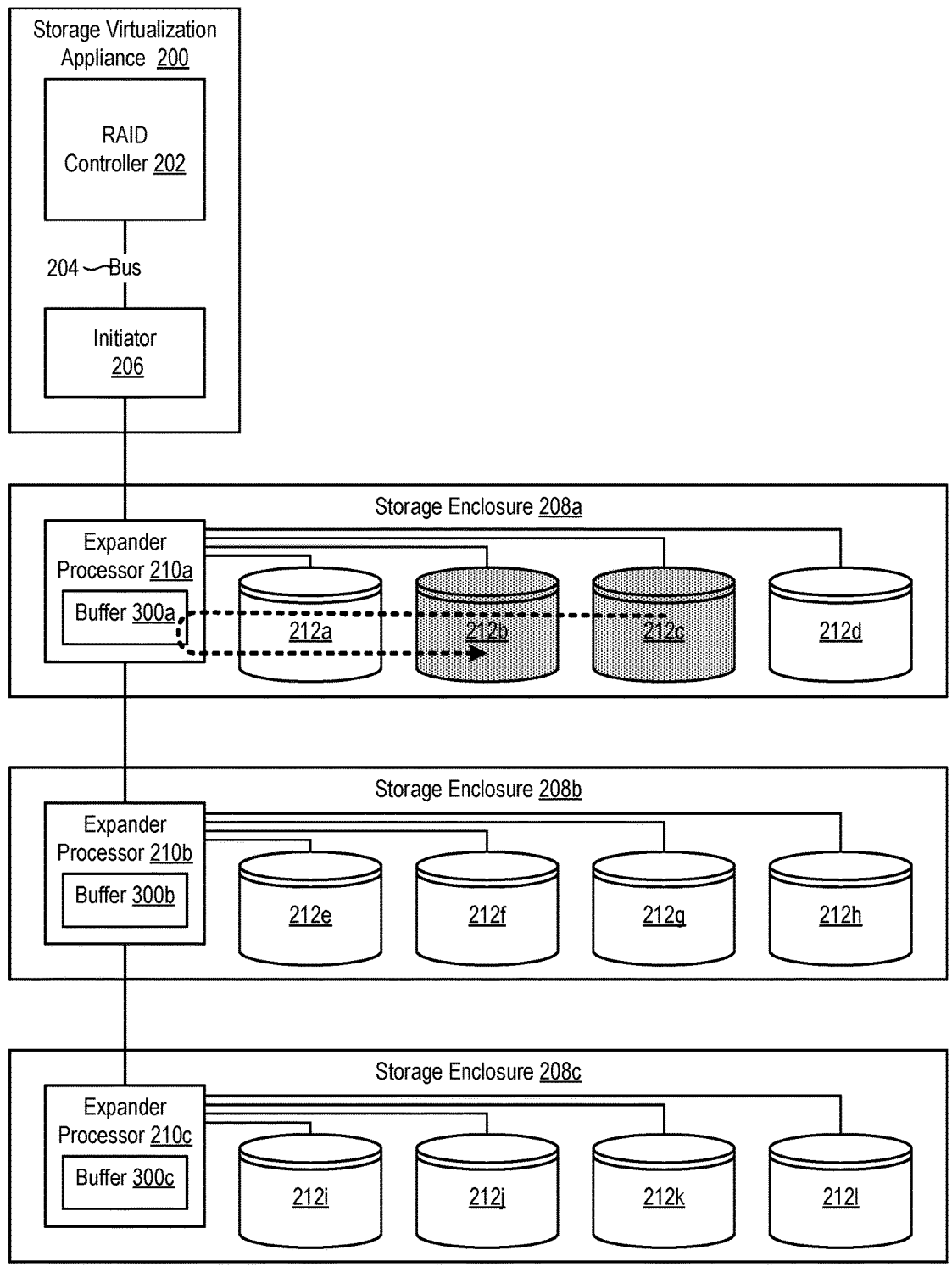
FIG. 4 is a high-level block diagram showing an improved method for copying data from a first storage drive to a second storage drive as part of a RAID rebuild process, where the first and second storage drives are in the same storage enclosure.

Referring to FIGS. 3 and 4, high-level block diagrams are provided that show the copying of data between storage drives 212 in a same storage enclosure 208a as part of a RAID rebuild process. FIG. 3 is a high-level block diagram showing a conventional process for copying data from a first storage drive 212c to a second storage drive 212b as part of a RAID rebuild process. FIG. 4 is a high-level block diagram showing an improved method for copying data from the first storage drive 212c to the second storage drive 212b that avoids pushing data through the initiator 206, bus 204, and RAID controller 202.

As shown in FIG. 3, in a conventional RAID rebuild process, data that is read from the first storage drive 212c is routed through the expander processor 210a, the initiator 206, and bus 204, to the RAID controller 202. The data is then returned through the same data path to the second storage drive 212b. As previously mentioned, this technique forces read and write traffic through the bottleneck created by the initiator 206 and bus 204, where it competes with normal I/O from host systems 106 and negatively impacts I/O performance.

As shown in FIG. 4, using an improved RAID rebuild process in accordance with the invention, the RAID controller 202 sends one or more instructions to the expander processor 210a instructing it to read data from the storage drive 212c and write it to the storage drive 212b. In response, the expander processor 210a reads the data from the first storage drive 212c into an internal buffer 300a, and then writes the data from the internal buffer 300a to the second storage drive 212b. In performing the read and write, the data bypasses the initiator 206, bus 204, and RAID controller 202.

Figure 5:
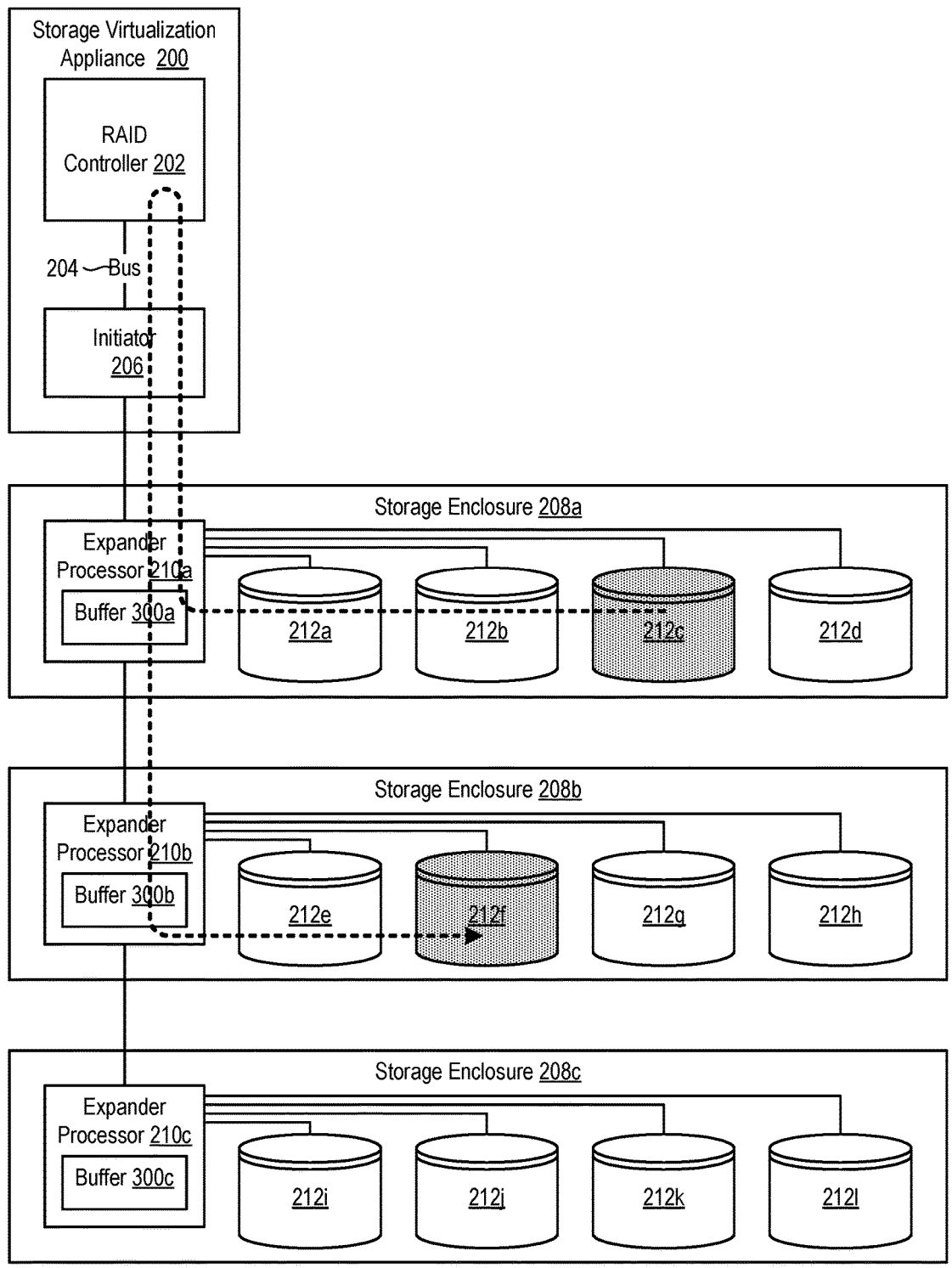
FIG. 5 is a high-level block diagram showing a conventional process for copying data from a first storage drive to a second storage drive as part of a RAID rebuild process, where the first and second storage drives are in different storage enclosures.
Figure 6:
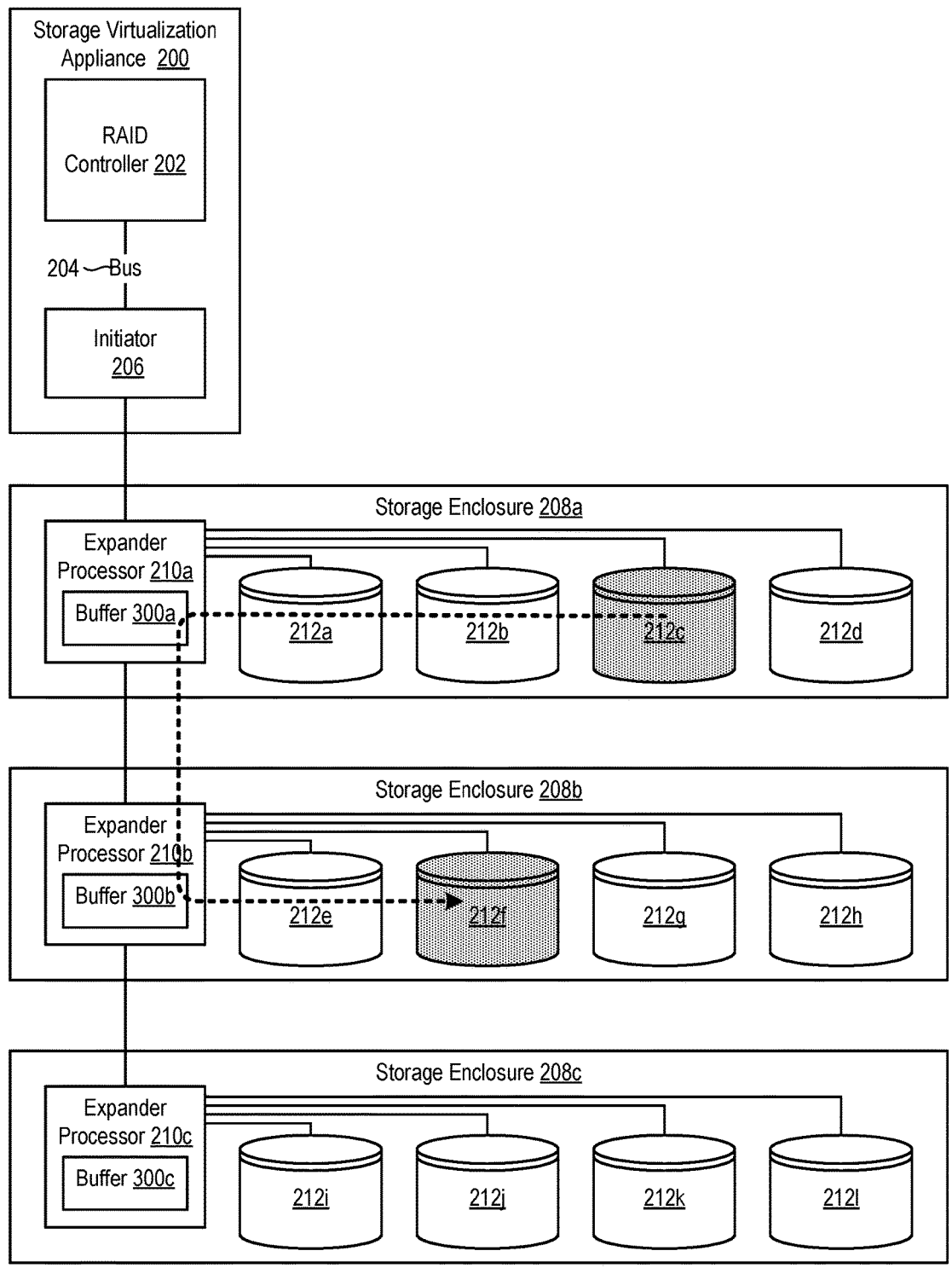
FIG. 6 is a high-level block diagram showing an improved process for copying data from a first storage drive to a second storage drive as part of a RAID rebuild process, where the first and second storage drives are in different storage enclosures.

Referring to FIGS. 5 and 6, high-level block diagrams are provided that show the copying of data between storage drives 212 in different storage enclosures 208a, 208b as part of a RAID rebuild process. FIG. 5 is a high-level block diagram showing a conventional process for copying data from a first storage drive 212c to a second storage drive 212f in different storage enclosures 208a, 208b. FIG. 6 is a high-level block diagram showing an improved method for copying data from the first storage drive 212c to the second storage drive 212f that avoids the data path through the 206, bus 204, and RAID controller 202.

As shown in FIG. 5, during a conventional RAID rebuild process, data that is read from the first storage drive 212 is routed through the expander processor 210a, the initiator 206, and bus 204, to the RAID controller 202. This data is then returned through bus 204, initiator 206, the expander processor 210a, and the expander processor 210b, where it is written to the second storage drive 212f. Like the previous example illustrated in FIG. 3, this process forces read and write traffic through the bottleneck created by the initiator 206 and bus 204, where it competes with normal I/O from the host systems 106 and negatively impacts response times.

As shown in FIG. 6, using an improved RAID rebuild process in accordance with the invention, the RAID controller 202 sends instructions to the expander processors 210a, 210b instructing them to read data from the storage drive 212c and write it to the storage drive 212f. For example, the RAID controller 202 may instruct the expander processor 210a to read data from the first storage drive 212c and save it in its internal buffer 300a. The expander processor 210 may return a token (containing, for example, an enclosure ID, buffer ID, etc.) to the RAID controller 202 identifying the location where the data is stored in the internal buffer 300a. The RAID controller 202 may transmit the token to the expander processor 210b along with an instruction to read the data in the location identified by the token and save it to its internal buffer 300b. The RAID controller 202 may then send an instruction to the expander processor 210b to write the data in its internal buffer 300b to the storage drive 212f. Like the previous example discussed in association with FIG. 4, this technique avoids transmitting data through the data path created by the initiator 206, bus 204, and RAID controller 202.

In general, the internal buffers 300 of the expander processors 210 may provide locations to "park" data while it is being moved between storage enclosures 208 and associated storage drives 212. When parking data in these internal buffers 300, the expander processors 210 may return tokens to the RAID controller 202 to indicate where the data is stored. This may enable the RAID controller 202a to instruct expander processors 210 to read and write data stored at particular locations in the internal buffers 300. The expander processors 210 may assist the RAID controller 202 in moving data between storage drives 212 as part of a RAID rebuild process, without having any concept of the RAID or how it is structured. The RAID controller 202, on the other hand, may understand the structure of the RAID and where data needs to be moved to rebuild the RAID. As a result, the RAID controller 202 may direct, through instructions transmitted to the expander processors 210, the RAID rebuild process without having to actually read or write data to the storage drives 212.

Figure 7:
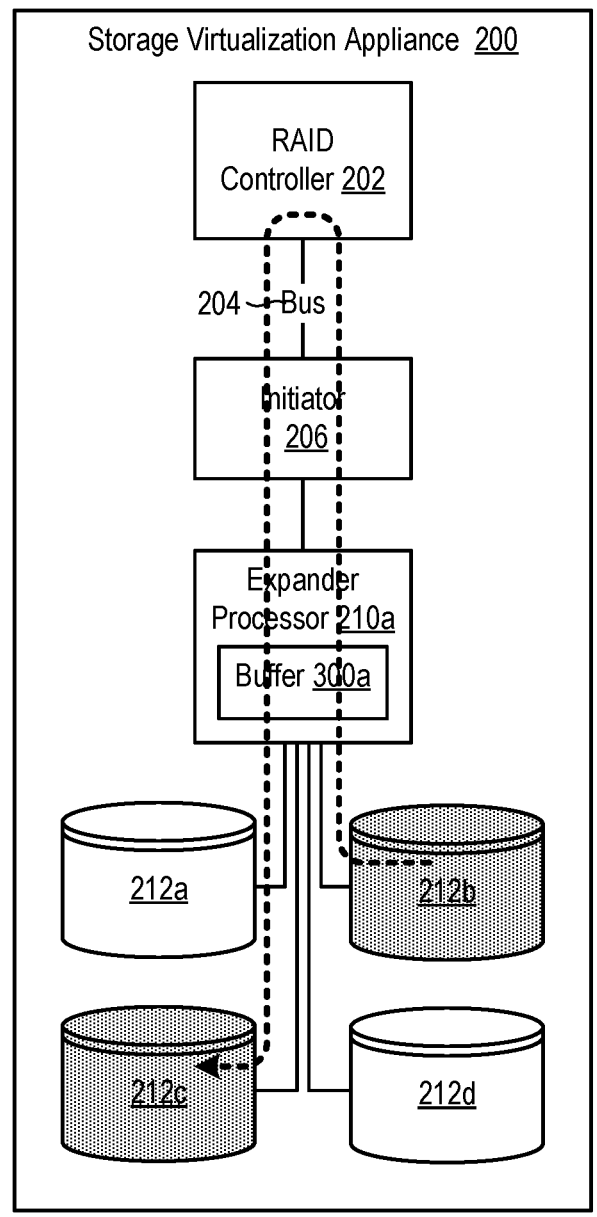
FIG. 7 is a high-level block diagram showing a conventional process for copying data from a first storage drive to a second storage drive as part of a RAID rebuild process, where the first and second storage drives are in the same storage virtualization appliance or storage enclosure as the RAID controller.
Figure 8:
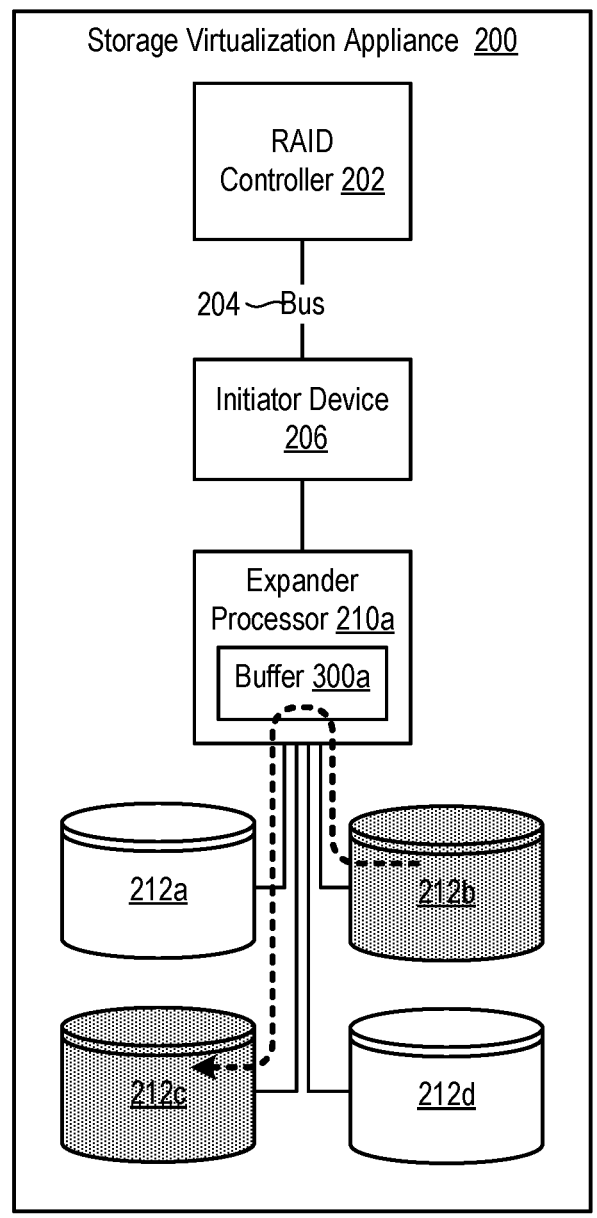
FIG. 8 is a high-level block diagram showing an improved process for copying data from a first storage drive to a second storage drive as part of a RAID rebuild process, where the first and second storage drives are in the same storage virtualization appliance or storage enclosure as the RAID controller.

Referring to FIGS. 7 and 8, high-level block diagrams are provided that show copying of data between storage drives 212 in the same storage virtualization appliance 200 (or enclosure 200) as the RAID controller 202. In certain embodiments, the storage virtualization appliance 200 may itself be a storage enclosure 208 and host storage drives 212 for implementing a RAID. FIG. 7 is a high-level block diagram showing a conventional process for copying data from a first storage drive 212b to a second storage drive 212c in the storage virtualization appliance 200. FIG. 8 is a high-level block diagram showing an improved method for copying data from the first storage drive 212b to the second storage drive 212c in the storage virtualization appliance 200.

As shown in FIG. 7, during a conventional RAID rebuild process, data that is read from the first storage drive 212b is routed through the expander processor 210a, initiator 206, and bus 204, to the RAID controller 202. This data is then returned through the bus 204, initiator 206, and expander processor 210b to be written to the second storage drive 212f. Like the previous examples illustrated in FIGS. 3 and 5, this technique routes read and write traffic through the initiator 206 and bus 204, where it competes with normal I/O from host systems 106.

As shown in FIG. 8, using an improved RAID rebuild process in accordance with the invention, the RAID controller 202 sends one or more instructions to the expander processor 210a instructing it to read data from the storage drive 212b and write it to the storage drive 212c. In response, the expander processor 210a reads the data from the first storage drive 212b into its internal buffer 300a, and then writes the data from its internal buffer 300a to the storage drive 212c. Alternatively, the expander processor 210a reads the data from the storage drive 212b and writes it to the storage drive 212c without storing it in its internal buffer 300a. Using this improved process, the data bypasses the initiator 206, bus 204, and RAID controller 202.

Referring generally to FIGS. 4, 6, and 8, various procedures may be put in place for handling errors in the storage system 110. In certain embodiments, if a read or write error is detected by an expander processor 210 when performing a read or write, this error may be reported to the RAID controller 202 to invoke error recovery procedures. In other embodiments, the expander processors 210 may attempt to correct or handle some errors such as simple transient errors by retrying operations before reporting the errors to the RAID controller 202. If these errors cannot be corrected, the expander processors 210 may report the errors to the RAID controller 202 to invoke error recovery procedures. Thus, in certain embodiments, the expander processors 210 may try to handle some types of errors while handing off others to the RAID controller 202. In other embodiments, all errors may be reported to and handled by the RAID controller 202.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for recovering data in a redundant array of independent disks (RAID), the method comprising:
   implementing a RAID in a storage architecture comprising a RAID controller and a first storage enclosure containing a first set of storage drives belonging to the RAID;
   detecting, by the RAID controller, a failure condition associated with at least one of the storage drives in the first set;
   sending, from the RAID controller to the first storage enclosure, a first instruction to copy first data from a first storage drive in the first set to a second storage drive in the first set as part of a RAID rebuild process; and
   executing, by the first storage enclosure, the first instruction without further involvement by the RAID controller.

2. The method of claim 1, wherein executing comprises executing by a first processor within the first storage enclosure.

3. The method of claim 1, wherein the storage architecture further comprises a second storage enclosure containing a second set of storage drives belonging to the RAID.

4. The method of claim 3, further comprising sending, from the RAID controller to the first storage enclosure, a second instruction to copy second data from the first storage drive of the first set to a third storage drive of the second set as part of the RAID rebuild process.

5. The method of claim 4, further comprising executing, by the first storage enclosure, the second instruction.

6. The method of claim 5, wherein executing the second instruction comprises sending, by the first processor, the second data to a second processor within the second storage enclosure.

7. The method of claim 6, further comprising writing, by the second processor, the second data to the third storage drive.

8. A computer program product for recovering data in a redundant array of independent disks (RAID), the computer program product comprising a non-transitory computer-readable storage medium having computer-usable program code embodied therein, the computer-usable program code configured to perform the following:
   implement a RAID in a storage architecture comprising a RAID controller and a first storage enclosure containing a first set of storage drives belonging to the RAID;
   detect, using the RAID controller, a failure condition associated with at least one of the storage drives in the first set;
   send, from the RAID controller to the first storage enclosure, a first instruction to copy first data from a first storage drive in the first set to a second storage drive in the first set as part of a RAID rebuild process; and
   execute, using the first storage enclosure, the first instruction without further involvement by the RAID controller.

9. The computer program product of claim 8, wherein executing comprises executing using a first processor within the first storage enclosure.

10. The computer program product of claim 8, wherein the storage architecture further comprises a second storage enclosure containing a second set of storage drives belonging to the RAID.

11. The computer program product of claim 10, wherein the computer-usable program code is further configured to send, from the RAID controller to the first storage enclosure, a second instruction to copy second data from the first storage drive of the first set to a third storage drive of the second set as part of the RAID rebuild process.

12. The computer program product of claim 11, wherein the computer-usable program code is further configured to execute, using the first storage enclosure, the second instruction.

13. The computer program product of claim 12, wherein executing the second instruction comprises sending, using the first processor, the second data to a second processor within the second storage enclosure.

14. The computer program product of claim 13, wherein the computer-usable program code is further configured to write, using the second processor, the second data to the third storage drive.

15. A system for recovering data in a redundant array of independent disks (RAID), the system comprising:
at least one processor;
at least one memory device coupled to the at least one processor and storing instructions for execution on the at least one processor, the instructions causing the at least one processor to:
implement a RAID in a storage architecture comprising a RAID controller and a first storage enclosure containing a first set of storage drives belonging to the RAID;
detect, using the RAID controller, a failure condition associated with at least one of the storage drives in the first set;
send, from the RAID controller to the first storage enclosure, a first instruction to copy first data from a first storage drive in the first set to a second storage drive in the first set as part of a RAID rebuild process; and
execute, using the first storage enclosure, the first instruction without further involvement by the RAID controller.

16. The system of claim 15, wherein executing comprises executing using a first processor within the first storage enclosure.

17. The system of claim 15, wherein the storage architecture further comprises a second storage enclosure containing a second set of storage drives belonging to the RAID.

18. The system of claim 17, wherein the instructions further cause the at least one processor to send, from the RAID controller to the first storage enclosure, a second instruction to copy second data from the first storage drive of the first set to a third storage drive of the second set as part of the RAID rebuild process.

19. The system of claim 18, wherein the instructions further cause the at least one processor to execute, using the first storage enclosure, the second instruction.

20. The system of claim 19, wherein executing the second instruction comprises sending, using the first processor, the second data to a second processor within the second storage enclosure.

* * * * *